United States Patent
Iwamura et al.

(10) Patent No.: US 7,530,031 B2
(45) Date of Patent: May 5, 2009

(54) CHARACTER INPUT DEVICE

(75) Inventors: Keiichi Iwamura, Yokohama (JP);
Osamu Ota, Tokamachi (JP); Junya Yamaguchi, Yokohama (JP); Shunsuke Tanaka, Yokohama (JP); Kazuhiro Yoshihara, Yokohama (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 527 days.

(21) Appl. No.: 10/351,383

(22) Filed: Jan. 27, 2003

(65) Prior Publication Data
US 2003/0179185 A1 Sep. 25, 2003

(30) Foreign Application Priority Data
Jan. 28, 2002 (JP) ............... 2002-018164

(51) Int. Cl.
*G06F 3/048* (2006.01)

(52) U.S. Cl. ................. 715/864; 715/780

(58) Field of Classification Search ........ 715/864, 715/784, 780; 345/864
See application file for complete search history.

(56) References Cited
U.S. PATENT DOCUMENTS

| | | | |
|---|---|---|---|
| 5,717,425 A | 2/1998 | Sasaki | |
| 6,002,390 A * | 12/1999 | Masui | 345/173 |
| 6,008,799 A * | 12/1999 | Van Kleeck | 345/173 |
| 6,011,542 A * | 1/2000 | Durrani et al. | 345/156 |

(Continued)

FOREIGN PATENT DOCUMENTS

EP 1 136 905 A2 9/2001

(Continued)

OTHER PUBLICATIONS

European Search Report issued on Dec. 3, 2008 in corresponding European Patent Application 03250627.1.

*Primary Examiner*—Kieu D Vu
*Assistant Examiner*—David Phantana-angkool
(74) *Attorney, Agent, or Firm*—Staas & Halsey LLP

(57) ABSTRACT

A character input device not completely occupying a screen, good in visibility, and enabling input of characters while reducing to a minimum the movement of the fingers and line of sight, which, in the case of input of for example the hiragana 50-character phonetic syllabary of the Japanese language, displays an initial block of the major group lead characters a (あ), ka (か), sa (さ), ta (た), na (な) on a first row of a character input region on a display screen and the block of the remaining major group lead characters ha (は), ma (ま), ya (や), ra (ら), wa (わ) on the second row, allows movement of a focus position or character position by "left" and "right" keys (a (あ)→ka (か)→sa (さ)→ . . . ), switches the character focused to the block of ha (は), ma (ま), ya (や), ra (ら), wa (わ) after the focus position reaches na (な), allows switching between displayed characters by for example using the "down" key to move to the next character (for example, a (あ)→i (い)→u (う)→ . . . ) and using the "up" key to move to the furthest character in the group (for example, a (あ)→ o (お)→ . . . ), and allowing input of the character by using a "decision" key when the character to be input is focused on.

14 Claims, 20 Drawing Sheets

U.S. PATENT DOCUMENTS

| | | | |
|---|---|---|---|
| 6,016,142 A * | 1/2000 | Chang et al. | 715/763 |
| 6,271,835 B1 * | 8/2001 | Hoeksma | 345/168 |
| 6,286,064 B1 * | 9/2001 | King et al. | 710/67 |
| 6,377,966 B1 * | 4/2002 | Cooper et al. | 715/542 |
| 6,567,072 B2 * | 5/2003 | Watanabe | 345/161 |
| 6,744,427 B2 * | 6/2004 | Maglio et al. | 345/184 |
| 6,848,080 B1 * | 1/2005 | Lee et al. | 715/533 |
| 6,980,200 B2 * | 12/2005 | Goren | 345/169 |
| 7,013,258 B1 * | 3/2006 | Su et al. | 704/1 |
| 7,015,899 B2 * | 3/2006 | Kim | 345/169 |
| 7,190,351 B1 * | 3/2007 | Goren | 345/173 |
| 2002/0054135 A1 | 5/2002 | Noguchi et al. | |

FOREIGN PATENT DOCUMENTS

| | | |
|---|---|---|
| GB | 2 165 071 A | 4/1986 |
| JP | 2000-155643 | 6/2000 |
| JP | 2001-265501 | 9/2001 |
| WO | 97/40465 A | 10/1997 |

\* cited by examiner

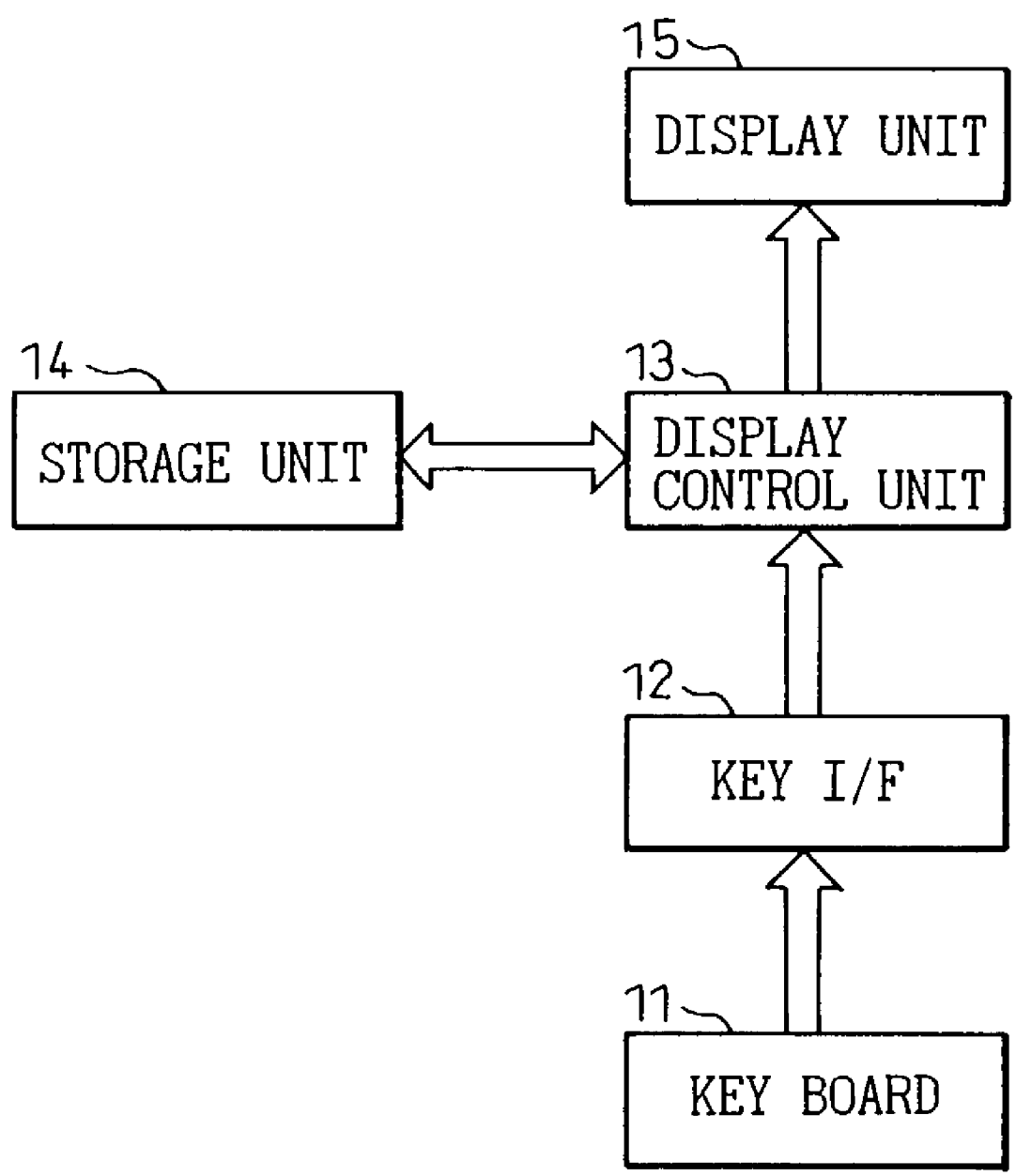

Fig.6A: CASE WHERE FOCUS IS PLACED AT POSITION OF "a"(あ)
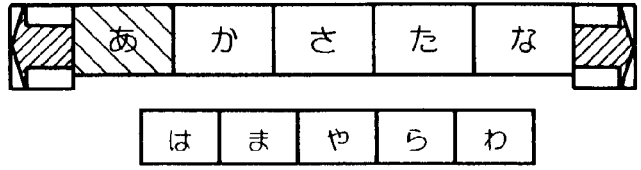
Fig.6B: IN STATE A, PRESS DOWN KEY
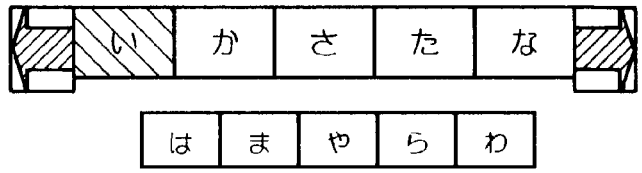
Fig.6C: IN STATE A, PRESS UP KEY
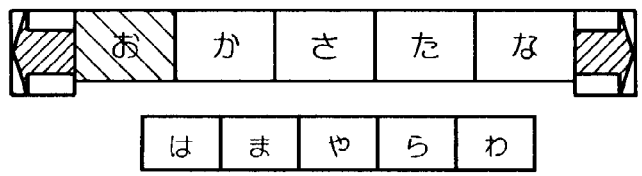
Fig.6D: IN STATE A, PRESS RIGHT KEY
Fig.6E: IN STATE A, PRESS LEFT KEY
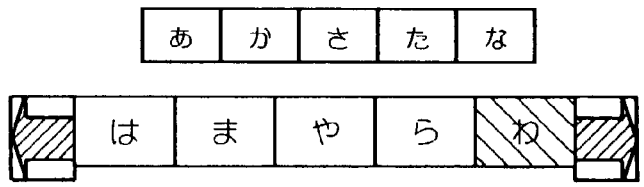
Fig.6F: CASE WHERE FOCUS IS PLACED AT POSITION OF "na"(な)
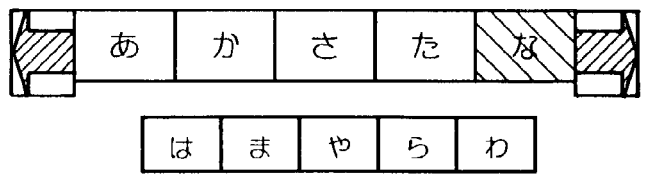

Fig.6G: IN STATE F, PRESS RIGHT KEY
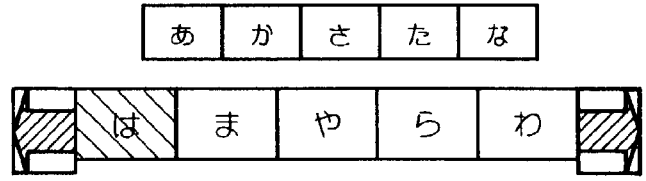
Fig.6H: IN STATE F, PRESS LEFT KEY
Fig.6I: CASE WHERE FOCUS IS PLACED AT POSITION OF "ha"(は)
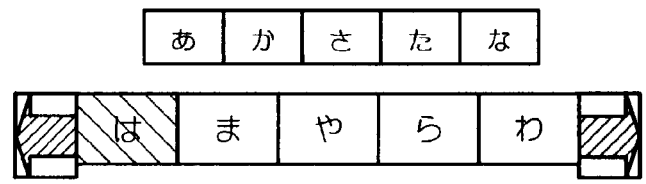
Fig.6J: IN STATE I, PRESS RIGHT KEY
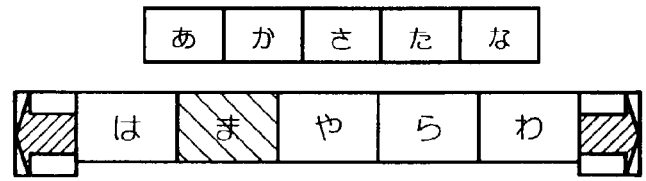
Fig.6K: IN STATE I, PRESS LEFT KEY
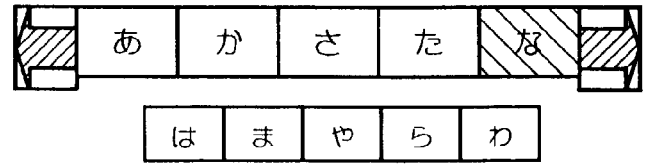
Fig.6L: CASE WHERE FOCUS IS PLACED AT POSITION OF "wa"(わ)
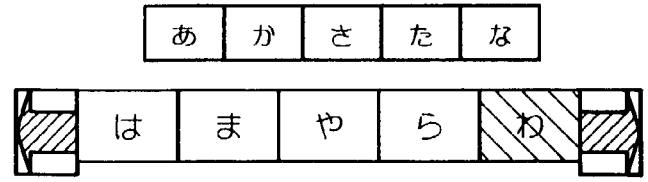

Fig.6M: IN STATE L, PRESS RIGHT KEY
Fig.6N: IN STATE L, PRESS LEFT KEY
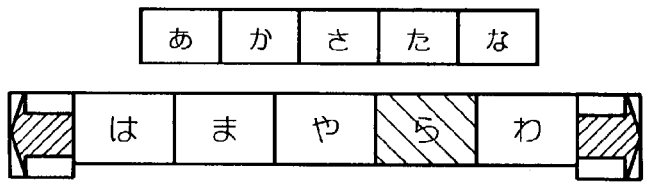
Fig.6O: CASE WHERE FOCUS IS PLACED AT POSITION OF "ka"(か)
Fig.6P: IN STATE O, PRESS WARP KEY
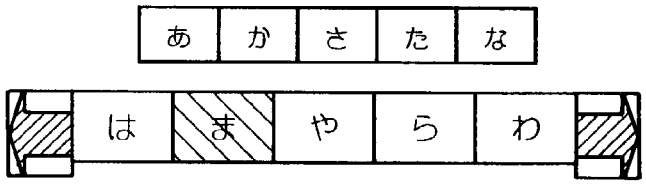
Fig.6Q: IN STATE P, PRESS WARP KEY
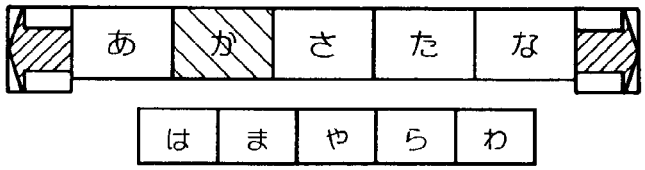

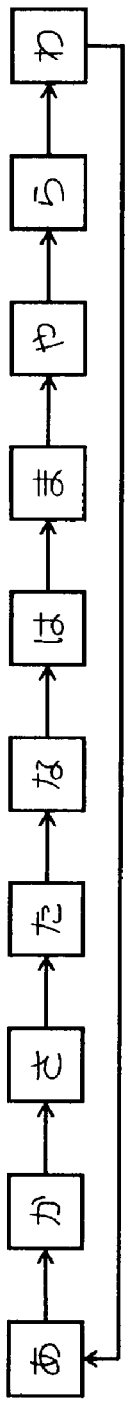
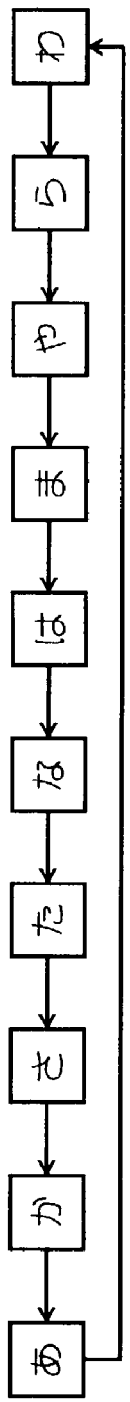
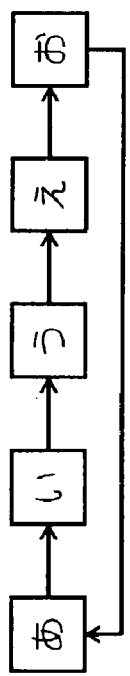
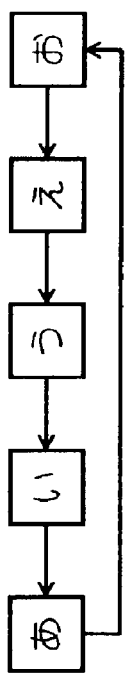
Fig.7A: MOVE BETWEEN ROWS (RIGHT CURSOR MOVEMENT)
Fig.7B: MOVE BETWEEN ROWS (LEFT CURSOR MOVEMENT)
Fig.7C: SWITCH CHARACTER IN ROW (DOWN CURSOR MOVEMENT)
Fig.7D: SWITCH CHARACTER IN ROW (UP CURSOR MOVEMENT)

Fig.8A: CHARACTER INPUT BOARD    TEXT ROW
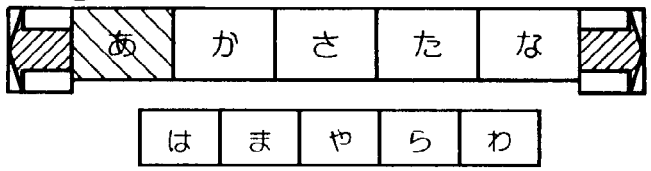 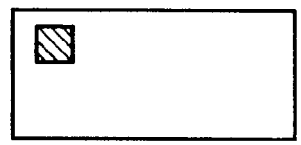
Fig.8B: DOWN KEY 4 TIMES OR UP KEY 1 TIME
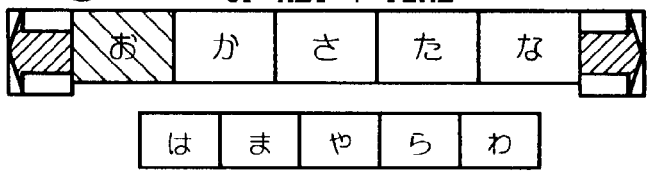 
Fig.8C: DECISION KEY
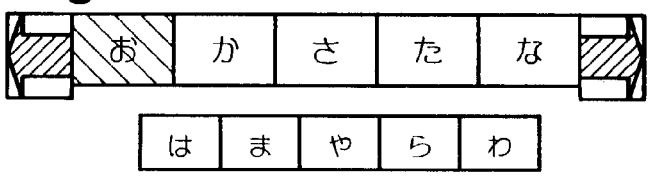 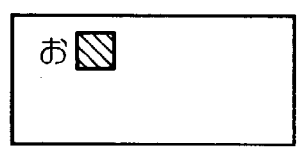
Fig.8D: WARP KEY 1 TIME AND RIGHT KEY 1 TIME; RIGHT KEY 6 TIMES; OR LEFT KEY 4 TIMES
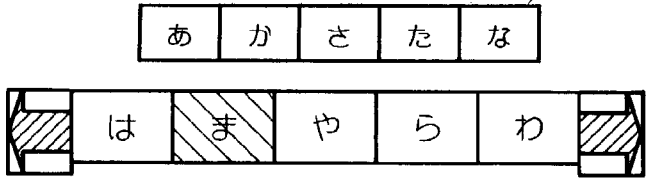 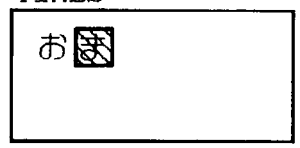
Fig.8E: DECISION KEY
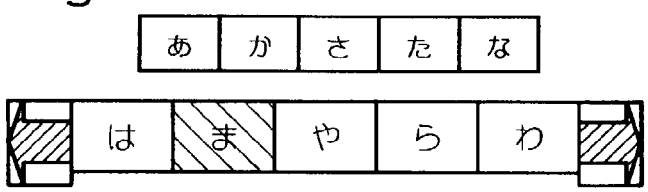 
Fig.8F: WARP KEY 1 TIME AND RIGHT KEY 2 TIMES; RIGHT KEY 7 TIMES; OR LEFT KEY 3 TIMES
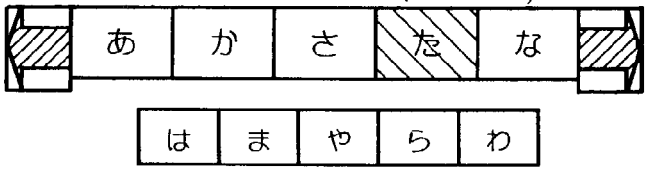 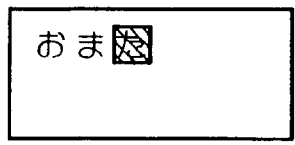

Fig.8G: DOWN KEY 2 TIMES OR UP KEY 3 TIMES
Fig.8H: DECISION KEY
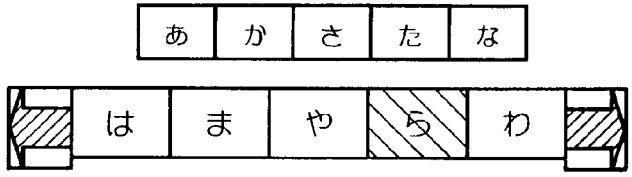
Fig.8I: WARP KEY 1 TIME; RIGHT KEY 5 TIMES; OR LEFT KEY 5 TIMES
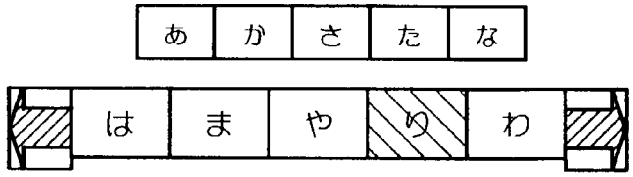
Fig.8J: DOWN KEY 1 TIME OR UP KEY 4 TIMES
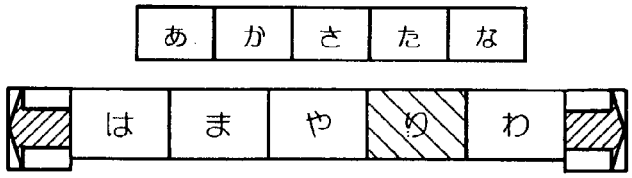
Fig.8K: DECISION KEY

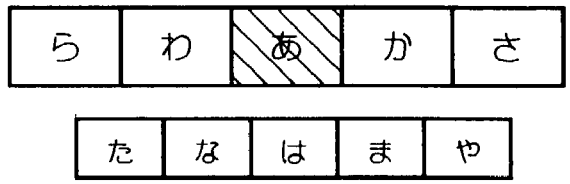
Fig.9A: INITIAL STATE
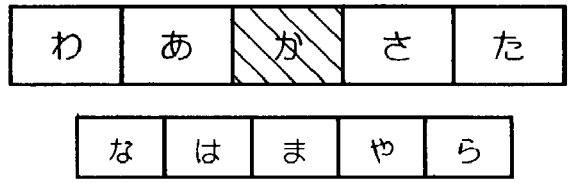
Fig.9B: IN STATE A, PRESS RIGHT KEY
Fig.9C: IN STATE B, PRESS RIGHT KEY
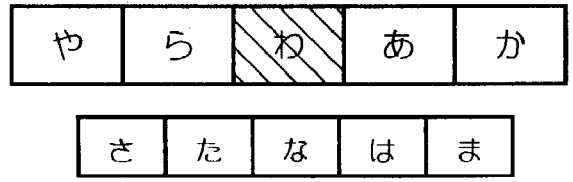
Fig.9D: IN STATE A, PRESS LEFT KEY
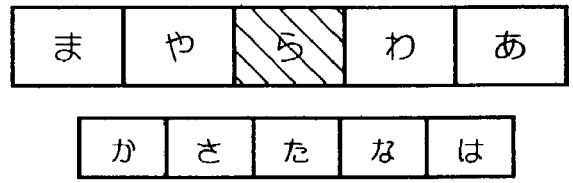
Fig.9E: IN STATE D, PRESS LEFT KEY
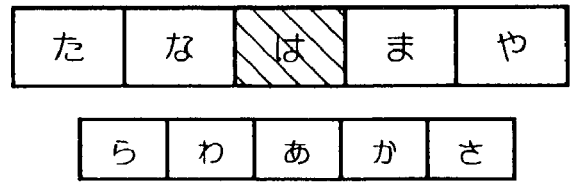
Fig.9F: IN STATE A, PRESS WARP KEY Fig.10A: INITIAL STATE
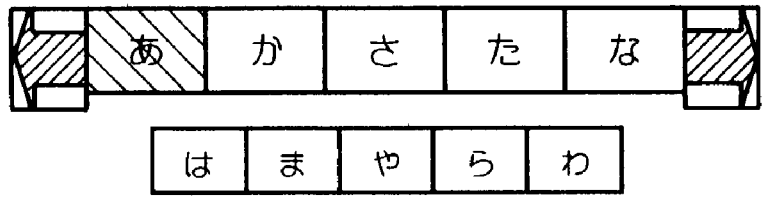
Fig.10B: IN STATE A, PRESS DOWN KEY
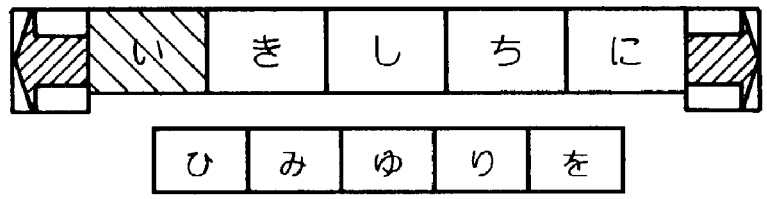
Fig.10C: IN STATE B, PRESS DOWN KEY
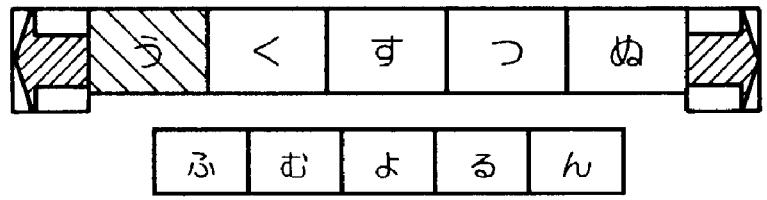
Fig.10D: IN STATE A, PRESS UP KEY
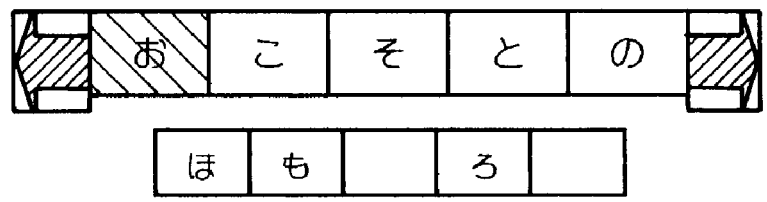
Fig.10E: IN STATE D, PRESS UP KEY
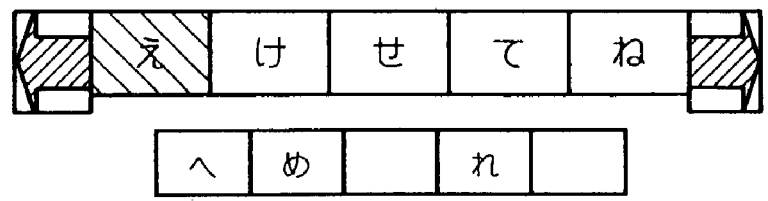

↓ RIGHT KEY

↓ RIGHT KEY

CHARACTER INPUT DEVICE

BACKGROUND OF THE INVENTION

1. Field of the Invention

The present invention relates to character input device usable for a mobile phone, PC, mobile terminal, word processor, household electrical appliance, etc., more particularly relates to a character input device designed to enable easy key input by few keys, primarily the directional keys, with less movement of the fingers and line of sight.

2. Description of the Related Art

In the mobile type character input devices of mobile phones etc., there is little area for disposition of the keys, so it is only possible to provide a limited number of keys.

Therefore, a large number of key operations were necessary to input a character. Here, "character" includes alphanumerics, symbols, and phonetic syllabaries or ideographs of different languages.

Take, for example, the case of inputting characters of the Japanese language hiragana phonetic syllabary in conventional mobile phones in use in Japan. The hiragana phonetic syllabary consists of 50 characters arranged in 10 groups of five characters each as follows:

a (あ) i (い) u (う) e (え) o (お)
ka (か) ki (き) ku (く) ke (け) ko (こ)
sa (さ) si (し) su (す) se (せ) so (そ)
ta (た) ti (ち) tu (つ) te (て) to (と)
na (な) ni (に) nu (ぬ) ne (ね) no (の)
ha (は) hi (ひ) hu (ふ) he (へ) ho (ほ)
ma (ま) mi (み) mu (む) me (め) mo (も)
ya (や) (i) yu (ゆ) (e) yo (よ)
ra (ら) ri (り) ru (る) re (れ) ro (ろ)
wa (わ) wi (ゐ) u (う) we (ゑ) wo (を)

The practice has been to assign one of the 10 rows of characters to each of the "0" to "9" keys, select one of the rows by pressing one of the keys, and select one of the five characters of the corresponding row by successively pressing that key.

Since the different rows of characters were assigned to separate keys in this way, a large amount of finger movement was involved. Beginners had to move their line of sight back and forth between the display and keys, so the efficiency of input was extremely poor.

Further, for example, if pressing the key assigned the row a (あ), i (い), u (う), e (え), o (お) once, a (あ) was input, if pressing it twice, i (い) was input, and similarly if pressing it three times, u (う), four times, e (え), and five times, o (お) was input. Therefore, to input o (お), it was necessary to press the key five times. Further, if intending to input i (い), but mistakenly pressing the key three times, it was necessary to repeatedly press the key until that character was again returned to. This led to increased stress to the user. In recent years, mobile phones provided with "return" keys to return to the previous character and thereby eliminate this problem have been seen, but since these basically add another key, they cannot be said to be effective in terms of input efficiency.

Further, as an alternative means, it may be considered to use a virtual keyboard enabling character selection by a mouse in a PC etc., but since the display units are small in size, this had the problem of over half of the screen being taken up by the virtual keyboard.

Japanese Unexamined Patent Publication (Kokai) No. 2001-265501 and Japanese Unexamined Patent Publication (Kokai) No. 2000-155643 disclose to solve this problem by adopting simplified character input systems.

Japanese Unexamined Patent Publication (Kokai) No. 2001-265501, however, discloses to arrange a specific character of each of the rows (for example, a (あ), ka (か), sa (さ), ta (た), na (な), ha (は), ma (ま), ya (や), ra (ら), wa (わ) on one row when inputting for example characters of the hiragana phonetic syllabary, so the visibility would probably become poor in a small display unit such as that of a mobile phone. Further, when focusing on the a (あ) row, movement to the ha (は) row required five key strokes by either of the "right" key or the "left" key.

Japanese Unexamined Patent Publication (Kokai) No. 2000-155643 also suffered from the above problem and also the inability to display all of the rows due to making them cyclic. Therefore, in this case as well, the problem of poor visibility arose.

SUMMARY OF THE INVENTION

A first object of the present invention is to provide a character input device enabling input by fewer keys and using surrounding keys such as directional keys so as to reduce to a minimum the movement of the fingers or line of sight occurring due to conventional character input.

A second object of the present invention is to provide a character input device enabling simple input or correction even when inputting the furthest character assigned to that row or mistaken input occurs.

A third object of the present invention is to provide a mobile type character input device not occupying the entire screen, good in visibility, and enabling character input while viewing a display unit.

A fourth object of the present invention is to provide a character input device enabling efficient movement between rows.

According to a first aspect of the present invention, there is provided a character input device comprising a display unit dividing a set of characters into a plurality of groups and simultaneously displaying specific characters of at least two of the groups on a character input region provided on a display screen, first and second input keys, and display control unit displaying in an identifiable manner a selected character among the characters displayed on the character input region, the display control unit switching between identifiably displayed characters or character sets in accordance with operation of the first input keys and replacing an identifiably displayed character with another character belonging to the same group as that character in accordance with operation of the second input keys.

Preferably, the display control unit assigns a specific order to the plurality of groups, moves the identifiably displayed position in a first direction from the character displayed on the character input region when one input key of the first input keys is operated, displays the next group of characters on the character input region when the one input key is operated after the identifiably displayed position reaches the last character in the displayed characters, moves the identifiably displayed position in a direction opposite to the first direction when another input key of the first input keys is operated, and displays the previous group of characters on the character input region when the other input key is operated after the identifiably displayed position reaches the head character in the displayed characters.

Alternatively, the first input keys are comprised of a pair of keys, and the display control unit assigns a specific order to the plurality of groups, fixes the identifiably displayed position at a specific position of the character input region, shifts the displayed characters in a first direction and successively displays the previous group of characters in the character input region when one input key of the first input keys is operated, and shifts the displayed characters in an opposite direction to the first direction and successively displays the next group of characters in the character input region when the other input key of the first input keys is operated.

More preferably, the second input keys are comprised of a pair of keys, and the display control unit replaces the currently identifiably displayed character or characters displayed in the same row or column as the character with other characters belonging to the same group as the character when one input key of the second input keys is operated, displays the head character of the group when the one input key is operated after the last character of the characters belonging to that group is displayed, replaces the currently identifiably displayed character or characters displayed in the same row or column as the character with other characters belonging to the same group as the character when the other input key of the second input keys is operated, and replaces the displayed character with the last character of the group when the other input key is operated after the head character of the characters belonging to that group is displayed.

Alternatively, the display control unit divides specific characters of the groups into a plurality of rows or columns, displays them in a predetermined order, and switches the identifiably displayed character to a character of another row or column when a "warp" key is operated.

Alternatively, the device displays the identifiably displayed character in bold face.

Alternatively, the device displays the characters smaller in the row or column direction around the identifiably displayed character.

Alternatively, the device displays a center character in an identifiable manner, displays characters of the previous or next group in the row direction or column direction, and displays characters belonging to the same group as the focused character in the column direction or row direction.

Alternatively, the device displays characters displayed in the character input region three-dimensionally by one of a block shape and cylindrical shape.

Alternatively, the device provides the screen of the display unit with a text region on which selected or input characters are displayed and displays the character input region at the cursor position of the text region.

Alternatively, the second input keys are comprised of numeral keys of "0" to "9", and the display control unit replaces the currently identifiably displayed character with a character belonging to the same group as the character and separated by exactly a number of positions corresponding to a selected numeral key when a numeral key is operated.

Alternatively, the device moves the identifiably displayed position or displayed character set at a predetermined time interval when a first input key is operated and switches between displayed characters at a predetermined time interval when a second input key is operated.

According to a second aspect of the present invention, there is provided a program for character input which selects a character from a set of characters displayed on a display unit and inputs the selected character, the program making a computer execute processing for dividing a set of characters into a plurality of groups and simultaneously displaying specific characters of at least two of the groups on a character input region provided on a display screen, processing for displaying in an identifiable manner a selected character among the characters displayed on the character input region and switching between identifiably displayed characters or character sets in accordance with operation of the first input keys, and processing for replacing an identifiably displayed character with another character belonging to the same group as that character in accordance with operation of the second input keys.

BRIEF DESCRIPTION OF THE DRAWINGS

These and other objects and features of the present invention will become clearer from the following description of the preferred embodiments given with reference to the attached drawings, wherein:

FIG. 2 is a block diagram of the configuration of a character input device of an embodiment of the present invention;

FIGS. 6A-6Q are explanatory views of the state of pressing direction keys from an initial state of a hiragana phonetic syllabary input board;

FIGS. 7A-7D are explanatory views of the operation of movement between rows and an operation of switching between characters of a row of a hiragana phonetic syllabary input board;

FIGS. 8A-8K are explanatory views of transition of an input board and the state of a text row in the case of inputting o (お), ma (ま), tu (つ), ri (り) by a hiragana phonetic syllabary input board;

FIGS. 9A-9F are explanatory views of the case of moving the rows and fixing the focus in a hiragana phonetic syllabary input board;

FIGS. 10A-10E are explanatory views of the case of switching between characters of a row for all rows in a hiragana phonetic syllabary input board;

DESCRIPTION OF THE PREFERRED EMBODIMENTS

Preferred embodiments of the present invention will be described in detail below while referring to the attached figures.

Figure 1A:
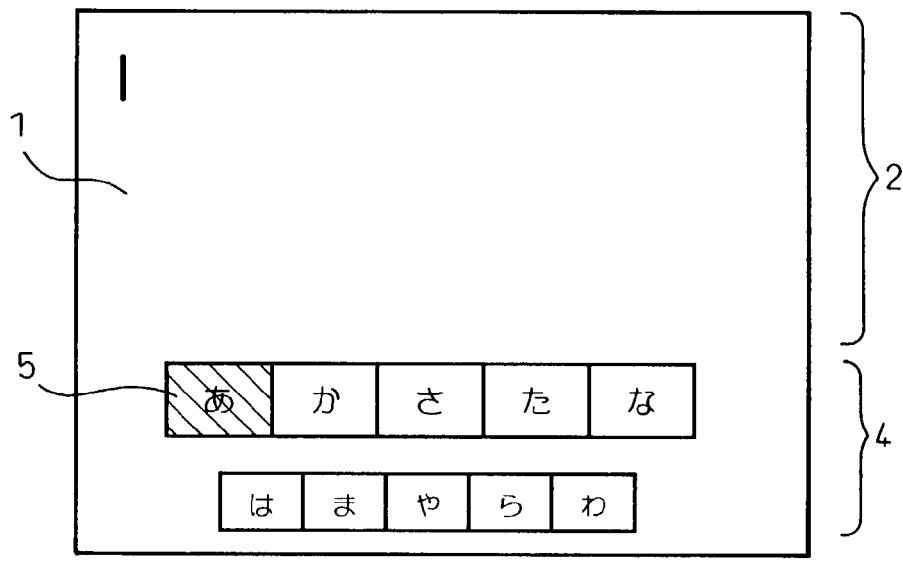
FIGS. 1A and 1B are views explaining the present invention in brief.
Figure 1B:
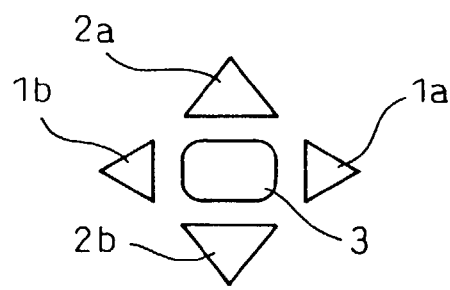

FIGS. 1A and 1B are views explaining the present invention in brief. In FIG. 1A, reference numeral 1 indicates a display screen, 2 a text region, 4 a character input region, and 5 a focus position. In the present invention, a set of characters to be input is divided into a plurality of groups.

For example, in the case of the hiragana phonetic syllabary, as shown in FIG. 1B, the set of characters are divided into the groups G of a (あ), i (い), u (う), e (え), o (お); ka (か), ki (き), ku (く), ke (け), ko (こ); etc. Similarly, in the case of alphanumerics, the set of characters is divided into the groups G of for example A, B, C, D, E; F, G, H, I, J; etc.

Further, specific characters of the different groups (for example, a (あ), ka (か), sa (さ), ta (た), na (な), ha (は), ma (ま), ya (や), ra (ら), wa (わ)) are divided into a plurality of rows or columns (for example, divided into a (あ), ka (か), sa (さ), ta (た), na (な) and ha (は), ma (ま), ya (や), ra (ら), wa (わ)) and displayed in a predetermined order.

Characters are input by displaying a specific character in the displayed characters in an identifiable manner (hereinafter referred to as "focused") in accordance with operation of first input keys (for example, the "left" and "right" keys 1a and 1b of FIG. 1A) and replacing a currently focused character or that character and characters displayed in the same row or column as that character with other characters belonging to the same group as that character in accordance with operation of the second input keys (for example, the "up" and "down" keys 2a and 2b of FIG. 1A).

In this way, the character to be input is focused on, and the "decision" key 3 is operated to input the selected character.

For example, when writing left to right by the hiragana phonetic syllabary, the character input region 4 displays, as shown in FIG. 1A, a (あ), ka (か), sa (さ), ta (た), na (な) in the first row and ha (は), ma (ま), ya (や), ra (ら), wa (わ) in the second row. Further, if moving the focus position or character position by the "left" and "right" keys 1a and 1b (a (あ)→ka (か)→sa (さ)→ . . . ), when the focus position reaches na (な), the next focused characters will become ha (は), ma (ま), ya (や), ra (ら), wa (わ).

Characters in a group are switched by for example moving to the next character by the "down" key (for example, a (あ)→i (い)→ . . . ) and moving to the furthest character in the group (the next character when the characters belonging to the group are arranged in reverse order, for example, a (あ)→o (お)→ . . . ) by the "up" key.

When focusing on the character to be input, the "decision" key 3 is used to input that character.

Due to this, the input operation is basically performed by only the directional keys and a selection key and it becomes possible to provide a character input method involving little movement of the fingers or line of sight. Further, even if mistakenly inputting an operation, correction becomes possible by pressing for example the "up" key or "down" key. Further, it becomes possible to prevent the entire screen from being occupied, provide good visibility, and input characters while viewing the display screen.

In the above, it is possible to fix the character position displayed and move the focus position in accordance with the operation of the first and second input keys. Further, it is possible to fix the focus position and move the character position in accordance with the operation of the first and second input keys.

Further, it is possible to switch the identifiably displayed character to a character of another view or column. It is possible to provide a "warp" key for switching to a character of another row or column.

For example, when the "warp" key is operated, the focused character is switched from one of a (あ), ka (か), sa (さ), ta (た), na (な) to one of ha (は), ma (ま), ya (や), ra (ら), wa (わ).

Due to this, the focused character can be switched by fewer key operations.

The present invention can further be configured to:

(1) display the focused character in bold face.

(2) display the characters smaller in the row or column direction from the identifiably displayed character.

(3) display the focused character at the center, display characters of the previous or next group in the row direction or column direction, and display characters belonging to the same group as the focused character in the column direction or row direction.

(4) display characters displayed in the character input region three-dimensionally by one of a block shape and cylindrical shape.

(5) provide the screen of the display unit with a text region on which selected or input characters are displayed and display the character input region at the cursor position of the text region.

(6) make the second input keys numeral keys of "0" to "9" and replace the currently focused character with a character belonging to the same group as the character and separated by exactly a number of positions corresponding to a selected numeral key when a numeral key is operated.

(7) move the focused character or focused character set at a predetermined time interval when a first input key is operated and switch between displayed characters at a predetermined time interval when a second input key is operated.

By configuring the invention as in the above (1) to (5), it is possible to improve the visibility more. Further, by configuring the invention as in the above (6) and (7), it is possible to improve the ease of operation.

FIG. 2 is a block diagram of the configuration of a character input device of an embodiment of the invention.

As shown in FIG. 2, the character input device of the present embodiment receives input of characters from a keyboard 11 provided with directional keys, a "decision" key, numeral keys, and other input use keys. After receiving input from the keyboard 11, the input is converted to a format able to be interpreted by the display control unit 13 by a key interface (called "key I/F") and notified to the display control unit 13.

The display control unit 13 displays the character input region on the display unit 15 and uses the key information acquired from the key I/F to decide the current focus position in the character input region, judge the switching of the character input board, draw not yet finally set characters, draw finally set characters, and perform other control. A storage unit 14 stores various programs and data required for character input.

The character input device, as explained above, may be used for a mobile phone, PC, mobile terminal, word processor, household electrical appliance, and other various apparatuses requiring character input. The various types of control in the above display control unit 13 are realized by processors etc. built in these apparatuses.

Figure 3:
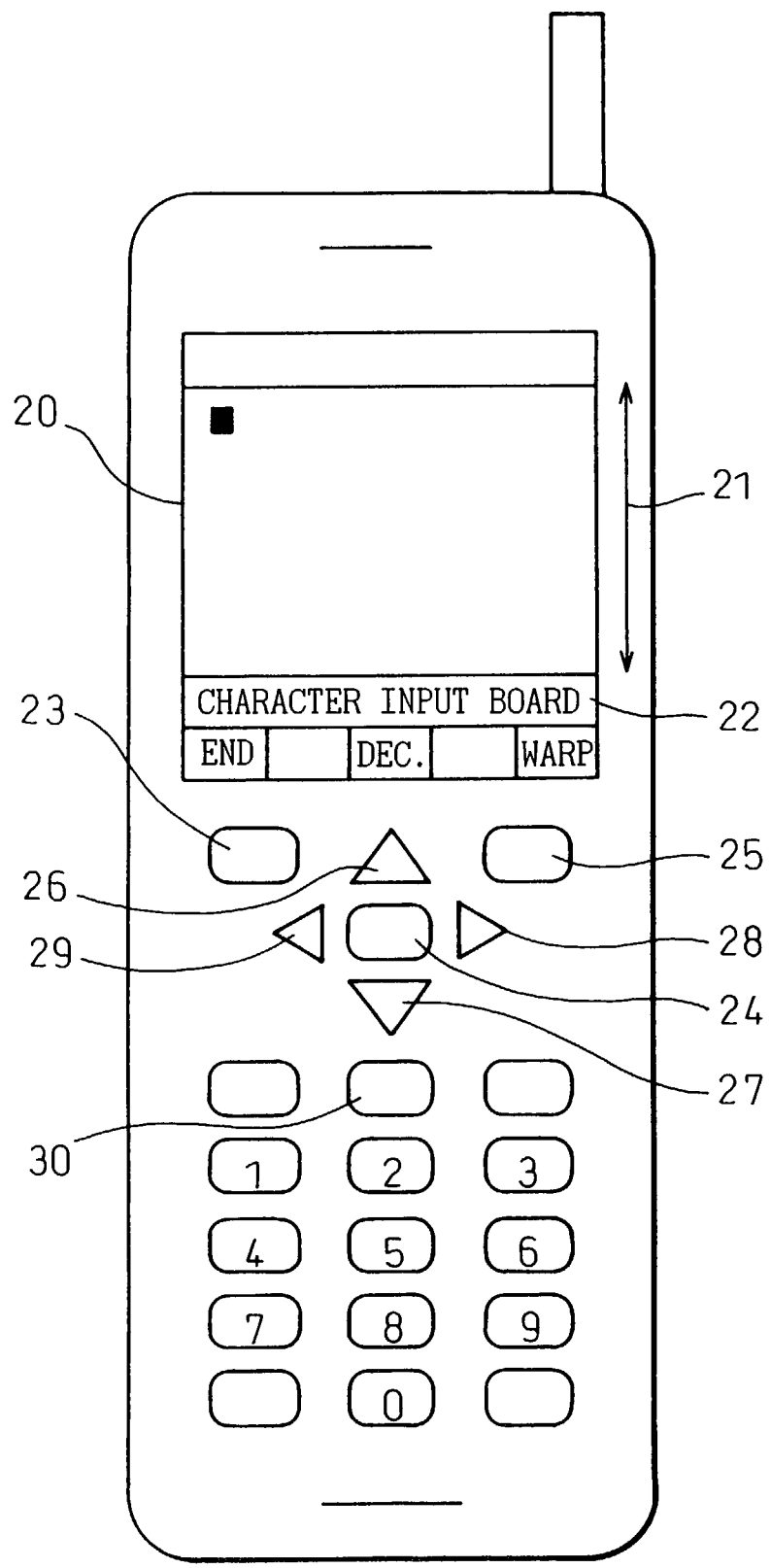
FIG. 3 is an outer view of the case of application of an embodiment of the present invention to a mobile phone.

FIG. 3 is an outer view of the case of application of the present embodiment to a mobile phone.

A liquid crystal display unit 20 is provided at the top part of the mobile phone. A text region (hereinafter referred to as a "text row 21") for displaying an input string of characters is provided from the top to the center of the screen of the liquid crystal display unit. Further, a character input region 22 (hereinafter referred to as a "character input board") serving as the character input means of the present embodiment is displayed at the bottom of the screen.

The character input board 22 can display at least two rows of character groups. Further, by making the number of characters in each row to be small, for example, five, visibility is improved compared with the case of including a large number of characters in a single row.

Various keys are arranged below the liquid crystal display unit 20. An "END" key 23 is a key for ending the character input. A "decision" key (DEC.) 24 is a key for finally setting the character of the focus position of the input board.

An "up" key 26, "down" key 27, "right" key 28, and "left" key 29 are as explained later keys for moving the focus of the character input board, changing rows, and switching between characters of a row of the focus position. A "clear" key 30 is a key for deleting one input character. Further, a "WARP" key 25 is a key for switching between upper and lower character input boards as explained later.

Note that FIG. 3 shows a mobile phone, but for example when applying the invention to character input of a PC or other apparatus with a relatively large display unit, the various keys may also be made buttons etc. displayed on the screen.

Figure 4A:
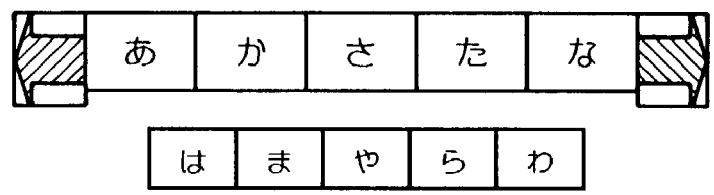
FIGS. 4A to 4C are explanatory views of types of character input boards.
Figure 4B:
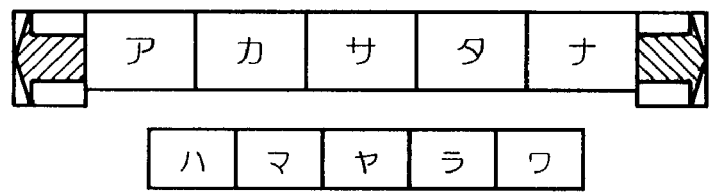
Figure 4C:
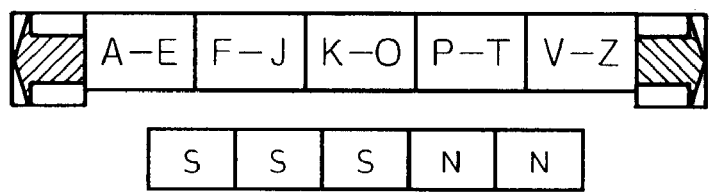

FIGS. 4A to 4C are views of examples of character input boards displayed on the display unit 15 in the present invention. Examples of character input regions for writing left to right are shown. Note that when writing from top to bottom, the character input boards may be displayed vertically. In each of the examples shown in the FIGS. 4A-4C, two rows of a character group are displayed on the character input board, and each row includes five characters or character groups.

The character input board used should be one in accordance with the type of characters to be input. For example, a hiragana phonetic syllabary input board of FIG. 4A should be used in the case of the hiragana phonetic syllabary, a katakana phonetic syllabary input board of FIG. 4B should be used in the case of the katakana phonetic syllabary, and an alphanumeric and symbol input board of FIG. 4C should be used in the case of alphanumerics and symbols. In the lower row of the alphanumeric and symbol input board shown in FIG. 4C, there are three portions of "S" and two portions of "N". In each portion of "S", a different symbol is displayed. In each portion of "N", a different numeral is displayed.

These character input boards are switched between by for example giving a switching function to a suitable key and pressing that key.

Figure 5A:
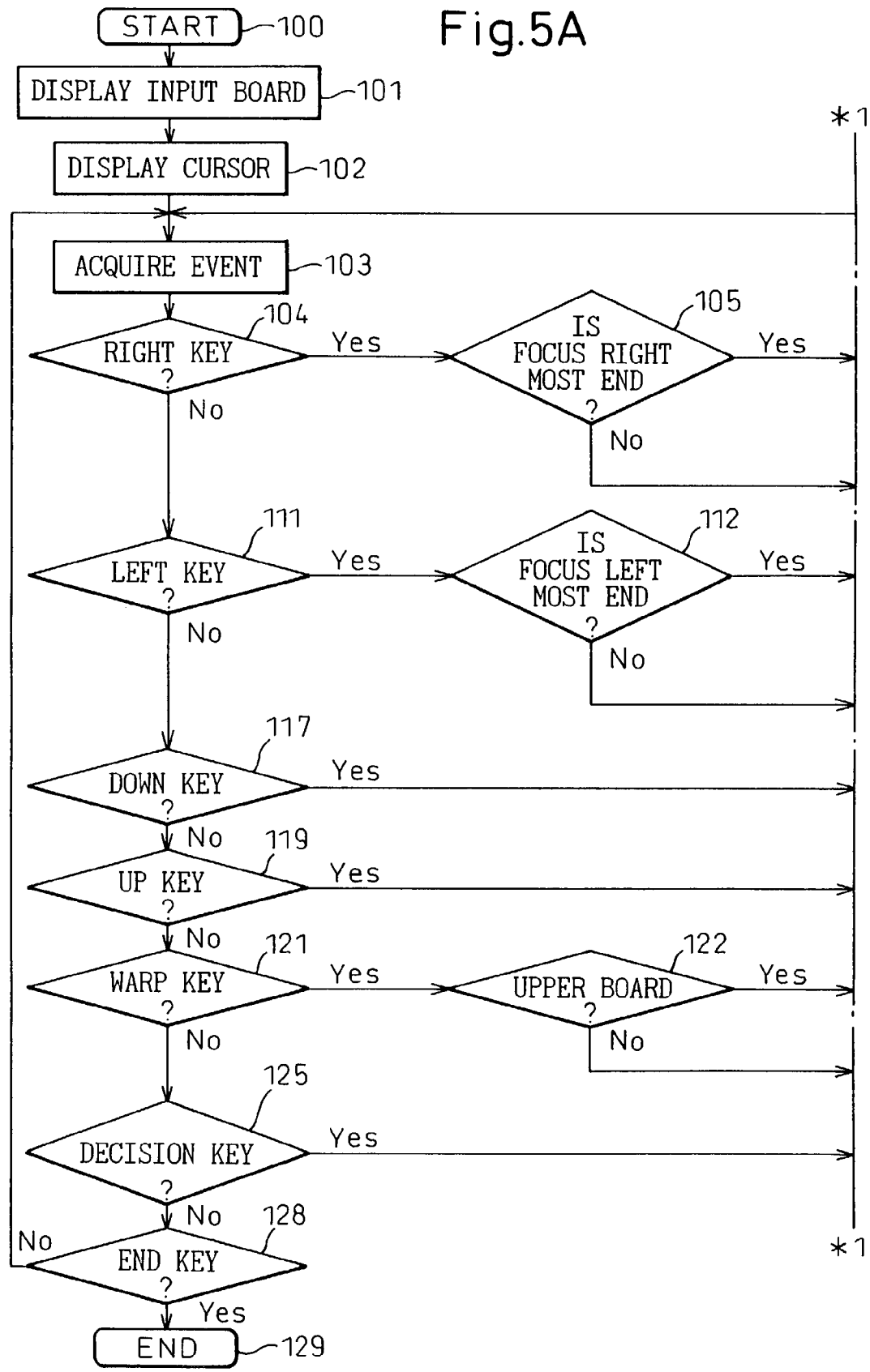
FIGS. 5A and 5B are a flow chart of the processing routine of a display control unit.
Figure 5B:
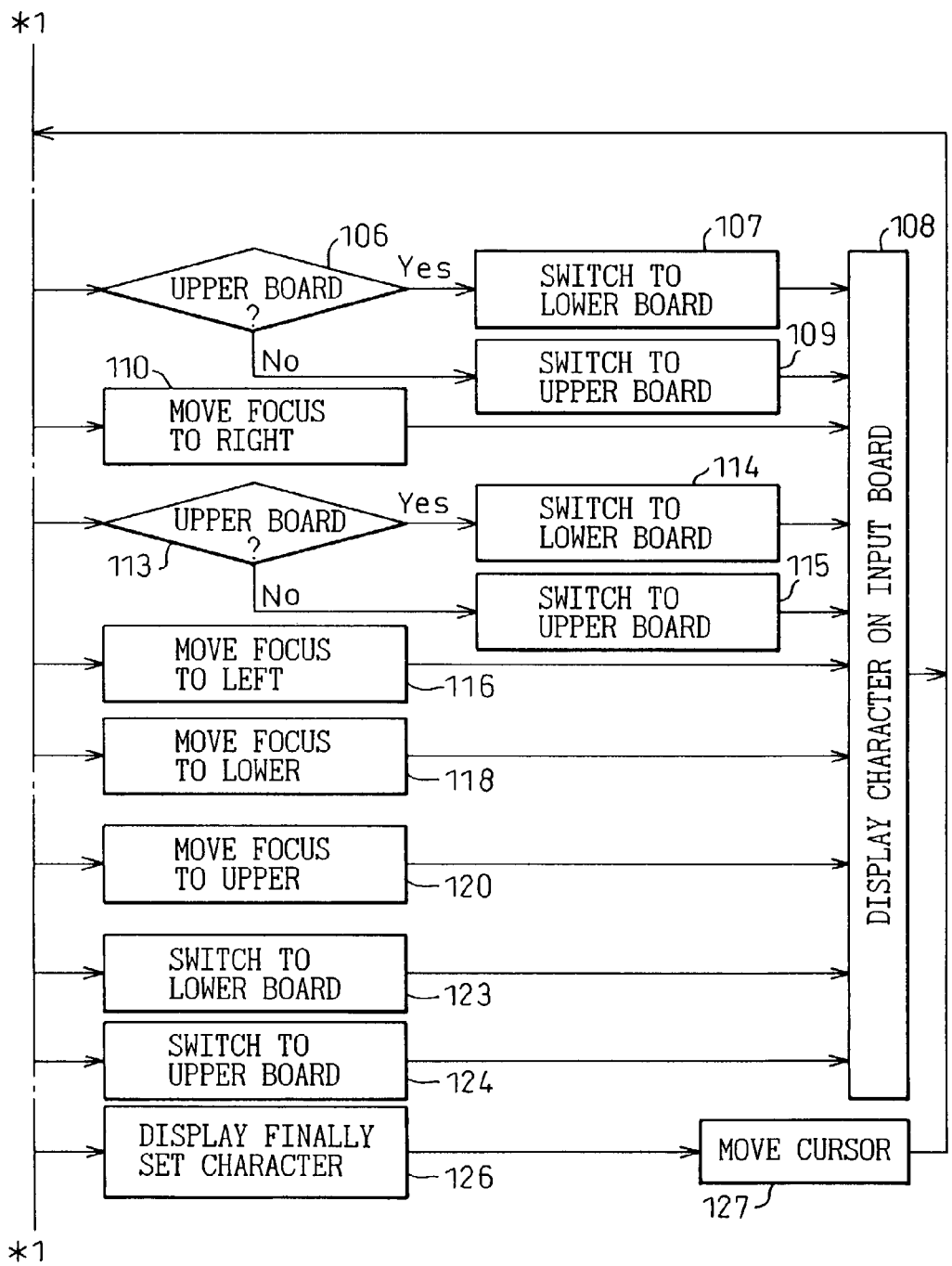

FIGS. 5A and 5B are a flow chart of the processing routine of the display control unit 13 shown in FIG. 2. Below, the above processing routine will be explained with reference to FIGS. 6A-6Q. Note that below, the explanation will be given of the case of use of the hiragana phonetic syllabary input board shown in FIG. 4A, but processing similar to the following explanation is performed in the case of use of other character input boards as well by just changing the types of characters displayed. Further, below, the upper portion of the character input board (portion where a (あ), ka (か), sa (さ), ta (た), na (な) is displayed) will be referred to as the "upper character input board", while the lower portion (portion where ha (は), ma (ま), ya (や), ra (ら), wa (わ) is displayed) will be referred to as the "lower character input board".

When the character input routine 100 using the character input board is started, at the first step 101, the character input board to be used is displayed at a suitable position on the screen.

At step 101, the hiragana phonetic syllabary input board is displayed. For example, as shown in FIG. 6A, the upper character input board becomes valid and the position of the a (あ) row of the character input board is focused on. Here, the a (あ) row is focused on, but in the initial state, it is possible to focus on any row and possible to make the lower character input board valid.

Next, at step 102, the cursor is displayed at the text row to display the characters input from the character input board. The cursor in this case does not display any character, but in the initial state, it is also possible to display the a character of the a (あ) row focused on. After this, at step 103, a key event standby state is maintained until acquiring a key event.

When acquiring a key event at step 103, processing for analyzing the key is started. At step 104, it is judged whether the acquired key event is the "right" key. If the "right" key, the routine proceeds to step 105.

Step 105 is the processing for judging if the focus position of the currently valid character input board (upper or lower) is the rightmost end. When the rightmost end (case where na (な) row is focused on as in FIG. 6F or case where wa (わ) row is focused on as in FIG. 6L), the routine proceeds to step 106.

At step 106, it is judged if the currently valid character input board is the upper board or lower board. If the upper character input board, the processing for switching to the lower character input board of step 107 is proceeded to, while if the lower character input board, the processing for switching to the upper character input board of step 109 is proceeded to.

In the processing for switching to the lower character input board of step 107, the up to then valid upper character input board is made invalid and conversely the up to then invalid lower character input board is made valid and the row of the leftmost end is focused on (FIG. 6G). At this time, the now valid character input board is displayed enlarged as shown in FIGS. 6A-6Q, while conversely the now invalid character input board is displayed small, whereby it is possible to clearly show which character input board is currently valid.

At step 109, conversely the lower character input board is made invalid, the upper character input board is made valid, and the leftmost row is focused on (FIG. 6M). After the processing of step 107 or step 109, step 108 is proceeded to, where the focused character of the character input board (when going through step 107, the ha (は) character, while when going through step 109, the a (あ) character) is displayed on the text row and the key event standby state again entered.

At step 105, when the focus position is not the rightmost end, step 110 is proceeded to.

Step 110 is processing for moving the focus of the character input board to the right. For example, the position of the ka (か) row is focused on as shown in FIG. 6D by the "right" key from the state of FIG. 6A. Further, the ma (ま) row is focused on as shown in FIG. 6J by the "right" key from the state of FIG. 6I. In this way, by combining the processing at the time of the rightmost end and the processing for moving the focus to the right, it is possible to continuously move the row by just the "right" key.

Next, the routine proceeds to step 108, where, in the example of FIG. 6D or FIG. 6J, the ka (か) or ma (ま) character is displayed in the text row as a not yet finally set character and the key event standby state is again entered.

When the judgement at step 104 does not show the "right" key, the routine proceeds to step 111, where it is judged if the acquired key event is the "left" key. If the "left" key, the routine proceeds to step 112.

Step 112 is processing for judging if the focus position of the currently valid character input board (upper or lower) is the leftmost end. If the leftmost end (case where the a row is focused on as in FIG. 6A or case where the ha (は) row is focused on as in FIG. 6I), the routine proceeds to step 113.

At step 113, it is judged if the currently valid character input board is the upper board or the lower board. If the upper character input board, the processing for switching to the lower character input board of step 114 is proceeded to, while if the lower character input board, the processing for switching to the upper character input board of step 115 is proceeded to.

In the processing for switching to the lower character input board of step 114, the up to then valid upper character input board is made invalid, while conversely the up to then invalid lower character input board is made valid and the rightmost end row is focused on (FIG. 6E).

At step 115, conversely the lower character input board is made invalid, the upper character input board is made valid, and the rightmost end row is focused on (FIG. 6K).

After the processing of step 114 or step 115, the routine proceeds to step 108, where the focused character of the character input board (in the case of going through step 114, the wa (わ) character, while in the case of going through the step 115, the na (な) character) is displayed in the text row and the key event standby state is again entered.

At step 112, when the focus position is not the leftmost end, the routine proceeds to step 116.

Step 116 is processing for moving the focus of the character input board to the left. The position of the ta (た) row is focused on as shown in FIG. 6H by the "left" key from the state of FIG. 6F. Further, the ra (ら) row is focused on as shown in FIG. 6N by the "left" key from the state of FIG. 6L. In this way, by combining the processing at the time of the leftmost end and the processing for moving the focus to the left, continuous movement of rows by just the "left" key becomes possible.

Next, the routine proceeds to step 108, where, in the example of FIG. 6H or FIG. 6N, the ta (た) or ra (ら) character is displayed in the text row as a not yet finally set character and the key event standby state is again entered.

When the judgement at step 111 does not show the "left" key, the routine proceeds to step 117, where it is judged if the acquired key event is the "down" key. If the "down" key, the routine proceeds to step 118.

Step 118 is processing for switching the character of the row of the character input board to the next character. For example, in the example of FIG. 6A, the currently focused character is switched to the i (い) character as shown in FIG. 6B. If continuing to press the "down" key in the state where the a (あ) row is focused on as shown in FIG. 6A, the focused character changes from i (い)→u (う)→e (え)→o (お)→a (あ). Due to this, it becomes possible to switch the characters of a row continuously.

After the processing of step 118, the routine proceeds to step 108, where the i (い) character is displayed in the text row as a not yet finally set character and the key event standby state is again entered.

When the judgement at step 117 does not show the "down" key, the routine proceeds to step 119, where it is judged if the acquired key event is the "up" key. If the "up" key, the routine proceeds to step 120.

Step 120 is processing for switching the character of the row of the character input board to the previous character. For example, in the example of FIG. 6A, the currently focused character is switched to the o (お) character as shown in FIG. 6C. If continuing to press the "up" key in the state where the a (あ) row is focused on as shown in FIG. 6A, the focused character changes from o (お)→e (え)→u (う)→i (い)→a (あ). Due to this, it becomes possible to switch the characters of a row continuously in the same way as the "down" key.

After the processing of step 120, the routine proceeds to step 108, where the o (お) character is displayed in the text row as a not yet finally set character and the key event standby state is again entered.

When the judgement at step 119 does not show the "up" key, the routine proceeds to step 121, where it is judged if the acquired key event is the "warp" key. If the "warp" key, the routine proceeds to step 122.

At step 122, it is judged if the currently valid character input board is the upper board or lower board. If the upper character input board, the processing for switching to the lower character input board of step 123 is proceeded to, while if the lower character input board, the processing for switching to the upper character input board of step 124 is proceeded to.

In the processing for switching to the lower character input board of step 123, the up to then valid upper character input board is made invalid and conversely the up to then invalid lower character input board is made valid and the same position as the focus position of the upper character input board is focused on (for example, the state of FIG. 6O shifts to the state of FIG. 6P).

At step 124, conversely the lower character input board is made invalid, the upper character input board is made valid, and the same position as the focus position of the lower character input board is focused on (for example, the state of FIG. 6P shifts to the state of FIG. 6Q).

After the processing of step 123 or step 124, step 108 is proceeded to, where the focused character of the character input board (when going through step 123, the ma (ま) character, while when going through step 124, the ka (か) character) is displayed on the text row and the key event standby state again entered.

At step 105, when the focus position is not the rightmost end, step 110 is proceeded to.

When the judgement at step 121 does not show the "warp" key, the routine proceeds to step 125, where it is judged if the acquired key event is the "decision" key. If the "decision" key, the routine proceeds to step 126.

At step 126, the focused character of the character input board is displayed in the text row as the finally set character and the input of one character is concluded. Next, the routine proceeds to step 127, where the cursor is moved to the right and the key event standby state is again entered.

When the judgement at step 125 does not show the "decision" key, the routine proceeds to step 128, where it is judged if the acquired key event is the "END" key. If the "END" key, the character input processing is ended. At this time, if there are not yet finally set characters in the text row, those characters are discarded. When not the "END" key, it is judged that the key was invalid and the key event standby state is again entered.

Further, input of the hiragana phonetic syllabary may be converted to the more commonly used Sino-Japanese ideographs. This can also be easily realized by just applying the processing of FIG. 5.

FIGS. 7A-7D are explanatory views of an example of operation of movement between rows and an operation of switching between characters of a row in the case of use of a hiragana phonetic syllabary input board. FIG. 7A shows the movement between rows in the case of pressing the "right" key. When continuously pressing the "right" key from the position of the a (あ) row, the focus moves from a (あ)→ka (か)→sa (さ)→ta (た)→na (な)→ha (は)→ma (ま)→ya (や)→ra (ら)→wa (わ)→a (あ).

FIG. 7B shows movement between rows in the case of pressing the "left" key. When continuously pressing the "left" key from the position of the a (あ) row, the focus moves from a (あ)→wa (わ)→ra (ら)→ya (や)→ma (ま)→ha (は)→na (な)→ta (た)→sa (さ)→ka (か)→a (あ).

FIG. 7C shows the switching between characters in a row in the case of pressing the "down" key. When continuously pressing the "down" key in the state where the focus is on the position of the a (あ) row, the characters are switched in order from a (あ)→i (い)→u (う)→e (え)→o (お)→a (あ).

FIG. 7D shows the switching between characters in a row in the case of pressing the "up" key. When continuously pressing the "up" key in the state where the focus is on the position of the a (あ) row, the characters are switched in order from a (あ)→o (お)→e (え)→u (う)→i (い)→a (あ).

FIGS. 8A-8K are explanatory views of transition of an input board and the state of a text row in the case of inputting o (お), ma (ま), tu (つ), ri (り) (for the Japanese word omaturi meaning "festival") by a hiragana phonetic syllabary input board.

At the same time as the start of the character input, as shown in FIG. 8A, the initial state of the character input board is displayed, the a (あ) row is focused on, and the cursor is displayed at the text row.

By pressing the "down" key four times from the state of FIG. 8A (whereby the character is switched in the order of →i (い)→u (う)→e (え)→o (お)) or pressing the "up" key once (whereby the character is switched to →o (お)), the state changes to that of FIG. 8B. In FIG. 8B, the o (お) character is displayed at the focus position of the character input board. The o (お) character is also displayed at the text row. Here, by pressing the "decision" key, the o (お) character is set (FIG. 8C). At this time, the o (お) character of the test row is set and the cursor is moved to the right.

By pressing the "WARP" key once from the state of FIG. 8C (whereby the focus shifts to the ha (は) of the lower character input board) and the "right" key once (whereby the focus shifts to →ma (ま)); the "right" key six times (whereby the focus shifts in order to →ka (か)→sa (さ)→ta (た)→na (な)→ha (は)→ma (ま)); or the "left" key four times (whereby the focus shifts in order to →wa (わ)→ra (ら)→ya (や)→ma (ま)), the state shwon in FIG. 8D is shifted to.

In FIG. 8D, the ma (ま) row of the character input board is focused on, and the ma (ま) character is displayed at the text row as well. Here, by pressing the "decision" key, the ma (ま) character is set and the cursor moves to the right.

By pressing the "WARP" key once from the state of FIG. 8E (whereby the focus shifts to the ka (か) of the upper character input board) and the "right" key two times (whereby the focus shifts to →sa (さ)→ta (た)); the "right" key seven times (whereby the focus shifts in order to →ya (や)→ra (ら)→wa (わ)→a (あ)→ka (か)→sa (さ)→ta (た)); or the "left" key three times (whereby the focus shifts in order to →ha (は)→na (な)→ta (た)), the state shown in FIG. 8F is shifted to.

In FIG. 8F, the ta (た) row of the character input board is focused on, and the ta (た) character is displayed at the text row as well. Here, by pressing the "down" key two times (whereby the character is switched to →ti (ち)→tu (つ)) or the "up" key three times (whereby the character is switched to →to (と)→te (て)→tu (つ)), the state shown in FIG. 8G is shifted to.

In FIG. 8G, the tu (つ) character is displayed at the focus position of the character input board, and the tu (つ) character is displayed at the text row as well. Here, by pressing the "decision" key, the tu (つ) character is set (FIG. 8H). At this time, the tu (つ) character of the text row is set and the cursor moves to the right.

By pressing the "warp" key once from the state of FIG. 8H (whereby the focus shifts to the ra (ら) of the lower character input board); the "right" key five times (whereby the focus shifts to →na (な)→ha (は)→ma (ま)→ya (や)→ra (ら)); or the "left" key five times (whereby the focus shifts in order to →sa (さ)→ka (か)→a (あ)→wa (わ)→ra (ら)), the state shown in FIG. 8I is shifted to.

In FIG. 8I, the ra (ら) character is displayed at the focus position of the character input board, and the ra (ら) character is displayed at the text row as well. Further, by pressing the "down" key once (whereby the character is switched to →ri (り)) or the "up" key four times (whereby the character is switched to →ro (ろ)→re (れ)→ru (る)→ri (り)), the state shown in FIG. 8J is shifted to. In FIG. 8J, the ri (り) character is displayed at the focus position of the character input board, and the ri (り) character is displayed at the text row as well.

Here, by pressing the "decision" key, the ri (り) character is set (FIG. 8K). At this time, the ri (り) character of the text row is set and the cursor moves to the right. The above operation enables the input of the hiragana phonetic syllabary word omaturi.

Above, the explanation was made of the case of movement of the focus position, but it is also possible to fix the focus position and move the rows (characters). FIGS. 9A to 9F are explanatory views of the case of moving the rows (characters) and fixing the focus in a character input board.

In the state of FIG. 9A, the focus is fixed at the position of the center a (あ) row.

If pressing the "right" key in this state, the rows displayed on the character input boards shift to the left, the ta (た) row of the leftmost end of the lower character input board moves to the rightmost end of the upper character input board, and the overflowing ra (ら) row moves to the rightmost end of the lower character input board (FIG. 9B). If the "right" key is further pressed, the rows move to the left, the na (な) row of the leftmost end of the lower character input board moves to the rightmost end of the upper character input board, and the overflowing wa (わ) row moves to the rightmost end of the lower character input board (FIG. 9C).

Further, in the state of FIG. 9A, if pressing the "left" key, the rows displayed on the character input boards shift to the right, the ya (や) row of the rightmost end of the lower character input board moves to the leftmost end of the upper character input board, and the overflowing sa (さ) row moves to the leftmost end of the lower character input board (FIG. 9D). If the "left" key is further pressed, the rows move to the right, the ma (ま) row of the rightmost end of the lower character input board moves to the leftmost end of the upper character input board, and the overflowing ka (か) row moves to the leftmost end of the lower character input board (FIG. 9E).

Further, in the state of FIG. 9A, if the "WARP" key is pressed, the upper characters and lower characters displayed in the character input boards are switched as shown in FIG. 9F.

In this way, it is possible to employ the above fixing method separate from the method of movement explained above for the focus of the character input boards.

FIGS. 10A-10E are explanatory views of the case of switching between characters of a row for all rows in a character input board. In the state of FIG. 10A, if pressing the "down" key, not just the focused on a (あ) row will be switched to the i (い) character, but the characters of all rows including the upper character input board and the lower character input board will be switched.

The character input boards in this case become the state shown in FIG. 10B. If further pressing the "down" key, the next character of the row will be switched to, and the character input boards will enter the state of FIG. 10C.

Further, if pressing the "up" key in the state of FIG. 10A, not just the focused on a (あ) row will be switched to the o (お) character, but the characters of all rows including the upper character input board and the lower character input board will be switched. The character input boards in this case become the state shown in FIG. 10D.

If further pressing the "up" key, the previous character of the row will be switched to, and the character input boards will enter the state of FIG. 10E. In this way, the characters of rows of the character input boards are switched not just for the focused on row, but for all rows.

Figure 11A:
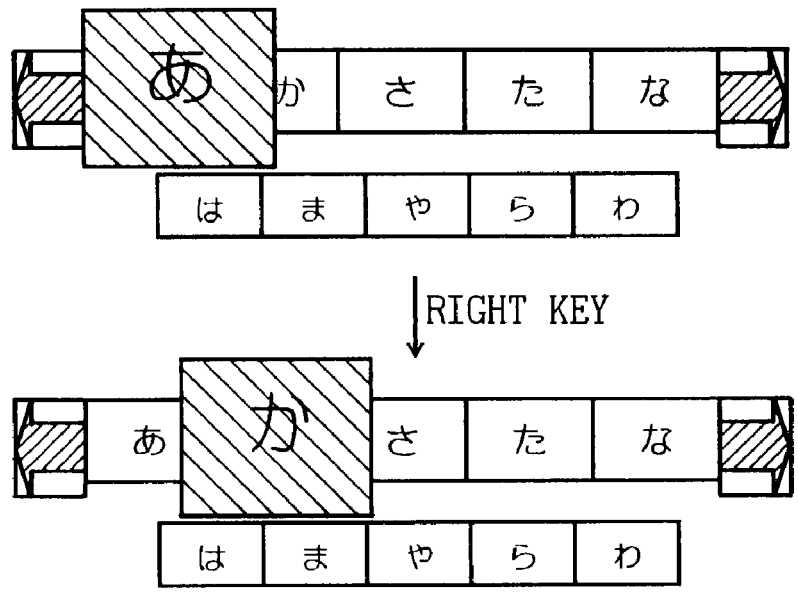
FIGS. 11A and 11B are explanatory views of the case of displaying enlarged the character of a focus position in a hiragana phonetic syllabary input board.
Figure 11B:
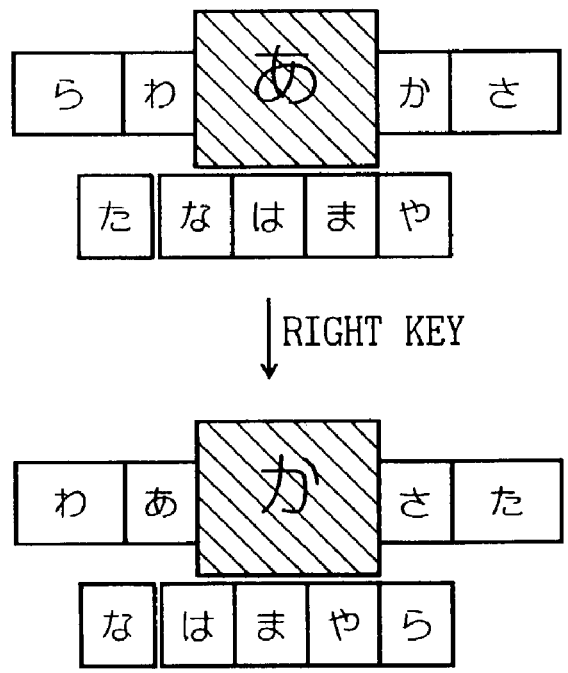

FIGS. 11A and 11B are explanatory views of the case of displaying enlarged the currently focused on character in a character input board to improve the visibility. FIG. 11A is an example of displaying a currently focused character enlarged in the method of movement of the focus.

FIG. 11B is an example of displaying a fixed focused character enlarged in the method of fixing the focus. By displaying the currently focused character enlarged in this way, it is possible to identify by one glance which character can be selected and improve the visibility.

Figure 12A:
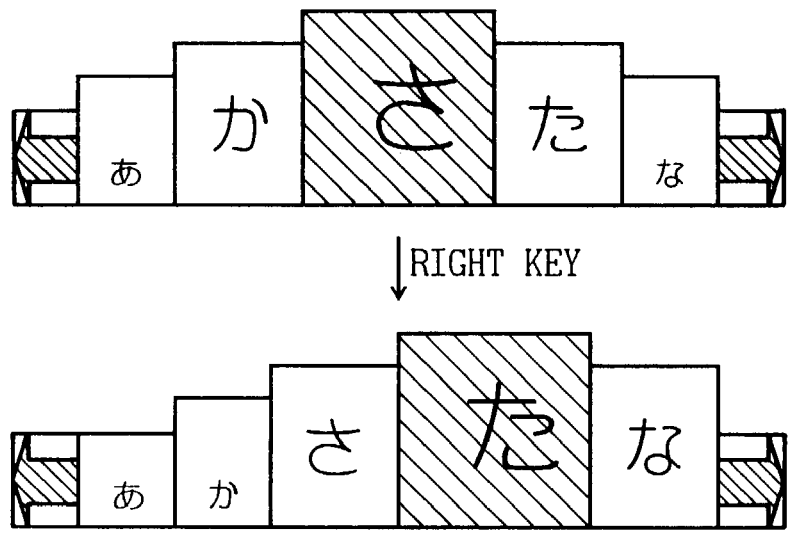
FIGS. 12A and 12B are explanatory views of the case of changing the size of the characters of a focus position and the other characters of a board in a hiragana phonetic syllabary input board.
Figure 12B:
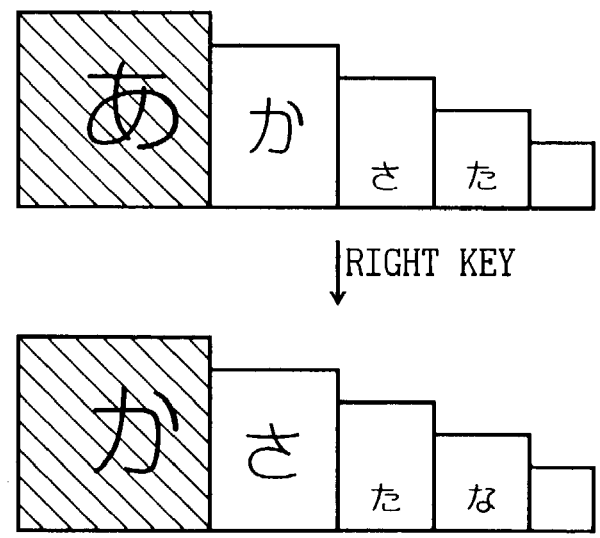

FIGS. 12A and 12B are explanatory views of the case of displaying the currently focused character enlarged to improve the visibility. The difference from the examples of FIGS. 11A and 11B is that a difference in size is also given to rows other than that of the focused character. FIG. 12A shows an example of the case of the method of movement of the focus, while FIG. 12B shows an example of the case of the method of fixing the focus.

Figure 13:
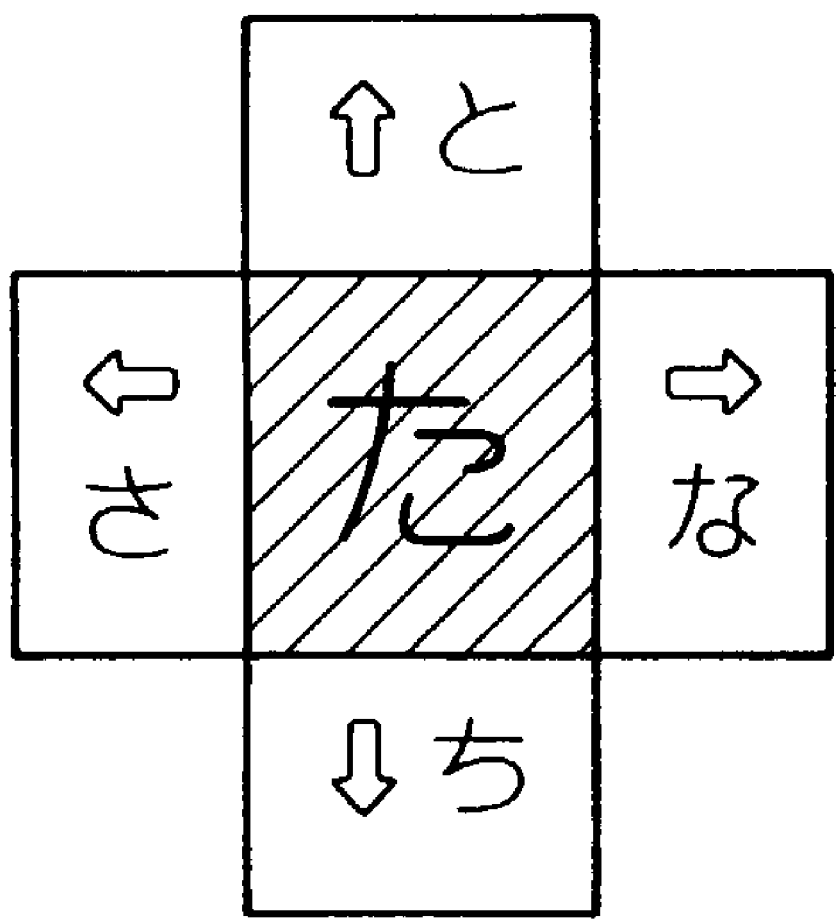
FIG. 13 is an explanatory view of a simplified type hiragana phonetic syllabary input board.

FIG. 13 is an explanatory view of an example of further simplification of a character input board.

In this example, the ta (た) row is displayed at the focus position, the na (な) row in the case of pressing the "right" key is displayed at the right, and the sa (さ) row in the case of pressing the "left" key is displayed at the left.

Further, under the focus position, the ti (ち) character in the case of pressing the "down" key at the ta (た) row is displayed, while above it, the to (と) character in the case of pressing the "up" key is displayed. By adopting this simplified character input board, it becomes possible to display a character input board by a smaller space when there is no space for displaying a regular character input board on the screen.

Figure 14A:
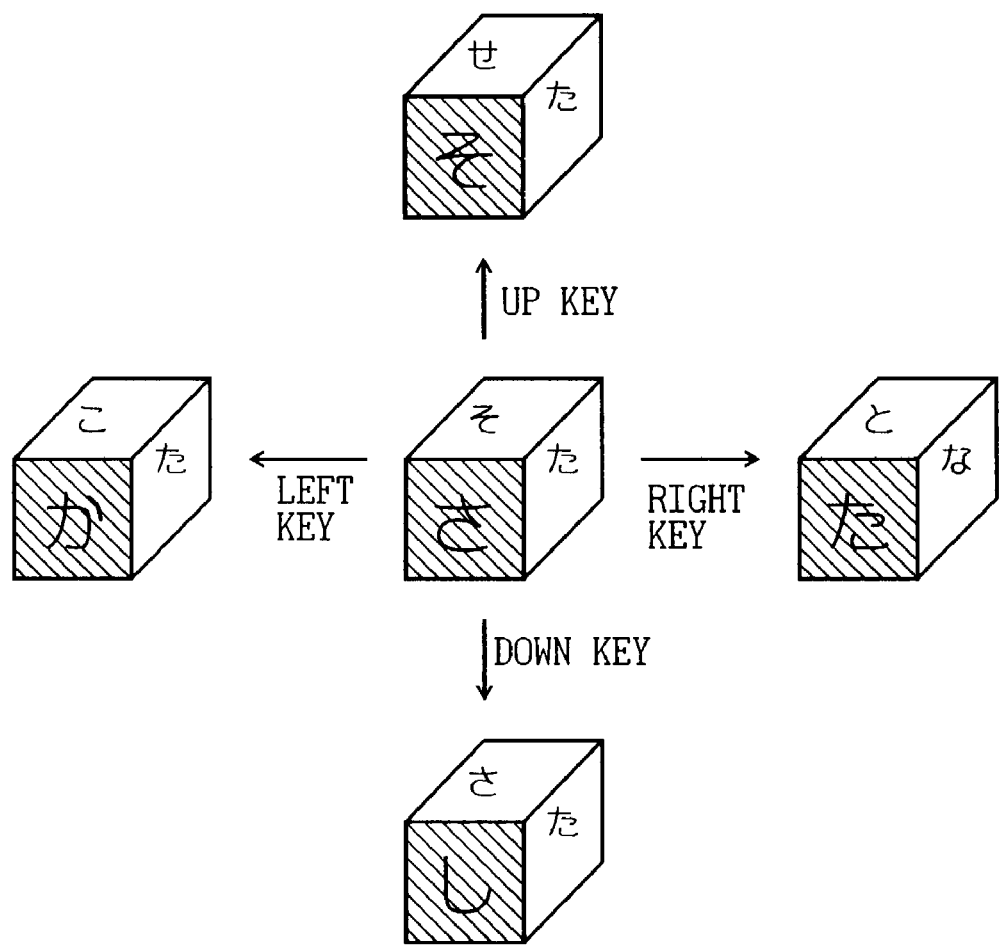
FIGS. 14A and 14B are explanatory views of the case of expressing a simplified type hiragana phonetic syllabary input board three-dimensionally.
Figure 14B:
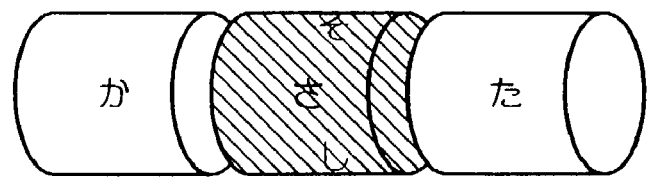

FIGS. 14A and 14B are explanatory views of examples of simplification of the character input board itself. The difference from the example of FIGS. 13A and 13B is that the character input board is displayed three-dimensionally.

FIG. 14A is an example of the use of block shaped character input boards. In the character input board having the center sa (さ) row displayed at its front face, the so (そ) character in the case of pressing the "up" key is displayed at the top face, while the ta (た) character of the ta (た) row when pressing the right key is displayed at the right face.

In this character input board, when pressing the "right" key, the ta (た) row moves to the front face, while when pressing the "left" key, the ka (か) row moves to the front face. When pressing the "down" key, the front face character switches to the second position si (し) character of the sa (さ) row, while when pressing the "up" key, the front face character switches to the furthest fifth position so (そ) character of the sa (さ) row.

FIG. 14B is an example of use of three horizontally aligned cylindrically shaped character input boards. The center part of the center character input board displays the character of the current focus position (in this example, the sa (さ) character of the sa (さ) row), the lower part displays the second position character si (し), and the top part displays the furthest fifth position character so (そ). The right character input board displays the ta (た) character of the ta (た) row, while the left character input board displays the ka (か) character of the ka (か) row.

In this way, by using three-dimensional character input boards, it is possible to display the character input boards by smaller space and to give a striking visual impact.

Figure 15:
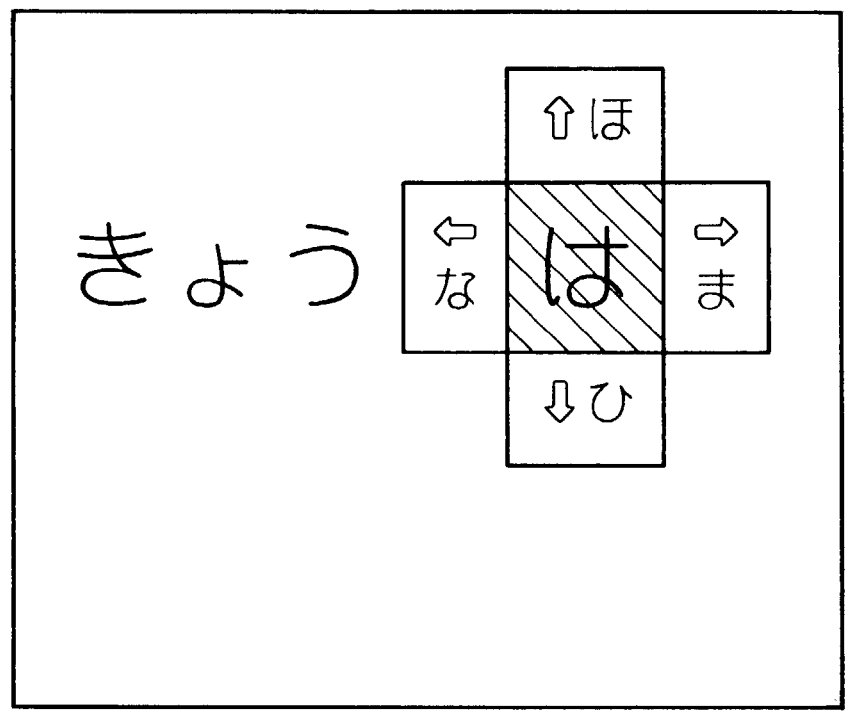
FIG. 15 is an explanatory view of the case of displaying a simplified type hiragana phonetic syllabary input board in the text row.

FIG. 15 is an explanatory view of an example of displaying the character input board shown in FIG. 13 at the cursor position of the text row. In this way, there is no need to secure display space for the character input board. The character input board can be used by replacing the cursor with the character input board as it is.

Figure 16:
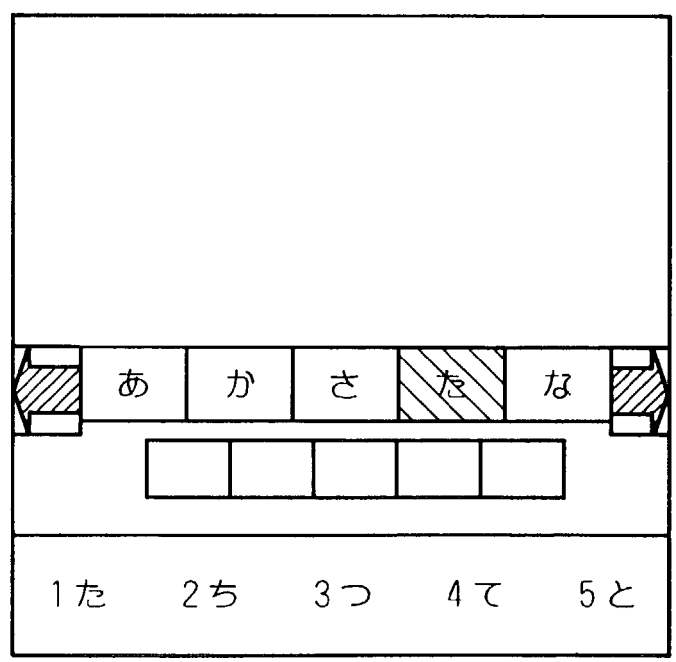
FIG. 16 is an explanatory view of the case of high speed input using both the hiragana phonetic syllabary input board and numeral keys.

FIG. 16 is an explanatory view of an example of inputting a character at a high speed in the character input board in combination with the numeral keys.

The rows of the character input boards are moved by the "left" and "right" keys, while the characters of the row at the focus position are linked with the numeral keys and displayed in a display region under the character input boards. In the case of this example, the ta (た) row is currently focused on, so it is possible to input the ta (た) character by the "1" numeral key, the ti (ち) character by the "2" numeral key, the tu (つ) character by the "3" numeral key, the te (て) character by the "4" numeral key, and the to (と) character by the "5" numeral key. Further, it is possible to conversely assign movement of rows to the numeral keys and select the characters of the row of the focus position by the "up" and "down" keys.

Figure 17:
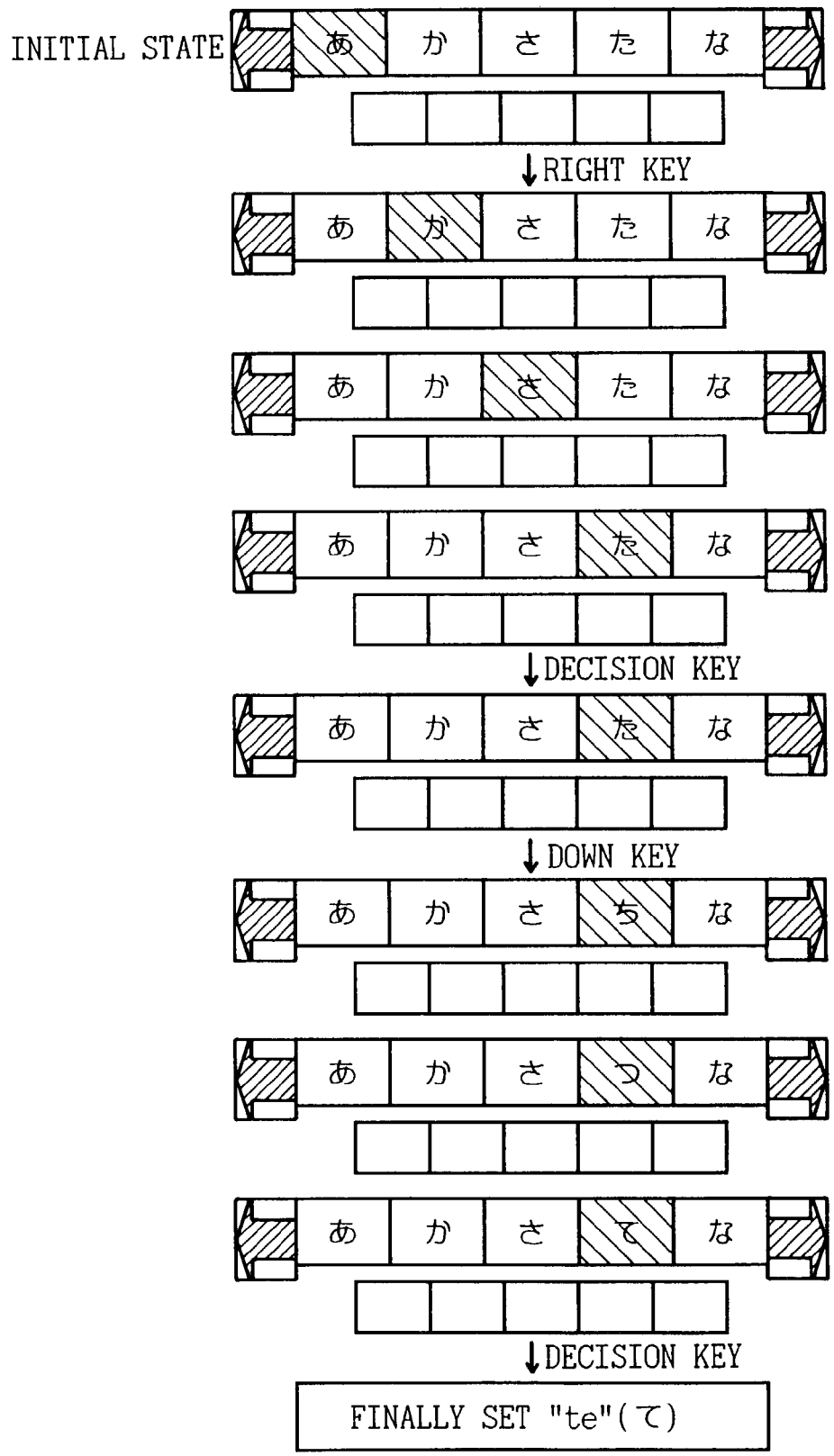
FIG. 17 is an explanatory view of the case of movement between rows and switching between characters of a row in a hiragana phonetic syllabary input board at predetermined time intervals.

FIG. 17 is an explanatory view of an example of automatic movement between rows and selection of characters of a row in a character input board.

If the "right" key (or "left" key) is pressed from the initial state, the focus automatically moves to the right (in the case of a "left" key, to the left) at predetermined time intervals.

When the target row is focused on, the "decision" key is used to complete the selection of the row. Further, if the "down" key (or "up" key) is pressed here, the character of the row of the focus position automatically is switched to the second position and third position (in the case of the "up" key, the fifth position and fourth position) at predetermined time intervals. When the target character is displayed, the "decision" key is used to complete the selection of the character.

The time interval of this automatic focus movement and automatic switching of characters of the focus position can be freely set by the user. Further, the explanation was given of use of the "up" and "down" keys for switching of characters of the row after selection of the row in the present example, but it is also possible to select the row, then switch characters in one fixed direction unconditionally. Further, it is possible to accept operation of a reverse key and change to the reverse direction even in the middle of row movement or character switching. In this way, it becomes possible to input characters by just a few key strokes even if using a character input board.

Above, in the embodiments of the present invention, the explanation was given mainly using the example of input of the hiragana phonetic syllabary, but as explained above, the invention can be similarly applied to the input of the katakana phonetic syllabary, the input of alphanumerics and symbols, and indeed the input of character sets of all other languages. The input of all characters can therefore be easily realized.

As explained above, according to the present invention, it is possible to obtain the following effects:

(1) It is possible to easily input characters by fewer keys and by just the surrounding keys including the directional keys with little movement of the fingers and line of sight. Further, it is possible to switch between characters in a row of the character input board by moving to the next character of the row by the "down" key and moving to the furthest character of the row by the "up" key. Therefore, even if mistakenly inputting an operation, correction becomes possible by pressing the "up" key or "down" key.

(2) The entire screen is prevented from being occupied, visibility is good, and characters can be input while viewing the display screen. Therefore, the invention can be easily applied to a small-sized device with a small screen such as a mobile phone, mobile terminal, etc. Further, by displaying the focused character large, displaying the characters in the row or column direct successively smaller from the focused character, displaying the characters three-dimensionally, or otherwise modifying the method of display of the character input board, visibility can be further improved.

(3) It is possible to provide a "warp" key and press the "warp" key to switch from a current character input board to an invalid character input board and thereby enable movement to a row furthest from the current focus position with few key operations and further improve the ease of operation.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2002-018164, filed on Jan. 28, 2002, the disclosure of which is expressly incorporated herein by reference in its entirety.

What is claimed is:

1. A character input device comprising
a display unit having a display screen simultaneously displaying, when characters of hiragana 50-character Japanese language phonetic syllabary or alphanumeric characters are divided into a plurality of groups comprising columns and rows, characters of at least two columns spanning from at least two lines on a character input region provided on said display screen,
a first group of two input keys and a second group of two input keys, and
a display control unit displaying, in an identifiable manner, at least one selected character among the characters displayed on the character input region,
said display control unit sequentially changing at least one character which is to be focused so as to be identifiable by scrolling at least two lines of characters in accordance with an operation of said first group of two input keys, said at least two lines of characters being displayed simultaneously; and
changing the character, which is being focused so as to be identifiable, with another character belonging to the same row as that character in accordance with operation of said second group of two input keys.

2. A character input device as set forth in claim 1, wherein said display control unit:
assigns a specific order to said plurality of groups,
moves the identifiably displayed position in a first direction from the character displayed on the character input region when one input key of said first group of two input keys is operated,
displays the next group of characters on the character input region when said one input key is operated after the identifiably displayed position reaches the last character in the displayed characters,
moves the identifiably displayed position in a direction opposite to the first direction when another input key of said first group of two input keys is operated, and
displays the previous group of characters on the character input region when said other input key is operated after the identifiably displayed position reaches the head character in the displayed characters.

3. A character input device as set forth in claim 1, wherein:
said first group of two input keys are comprised of a pair of keys and
said display control unit
assigns a specific order to said plurality of groups,
fixes said identifiably displayed position at a specific position of the character input region,
shifts the displayed characters in a first direction and successively displays the previous group of characters in the character input region when one input key of said first group of two input keys is operated, and
shifts the displayed characters in an opposite direction to the first direction and successively displays the next group of characters in the character input region when the other input key of said first group of two input keys is operated.

4. A character input device as set forth in claim 1, wherein said second group of two input keys are comprised of a pair of keys and
said display control unit
replaces the currently identifiably displayed character or characters displayed in the same row or column as said character with other characters belonging to the same group as said character when one input key of said second group of two input keys is operated,
displays the head character of said group when said one input key is operated after the last character of the characters belonging to that group is displayed,
replaces the currently identifiably displayed character or characters displayed in the same row or column as said character with other characters belonging to the same group as said character when the other input key of said second group of two input keys is operated, and
replaces the displayed character with the last character of said group when said other input key is operated after the head character of the characters belonging to that group is displayed.

5. A character input device as set forth in claim 1, wherein said display control unit divides specific characters of the groups into a plurality of rows or columns, displays them in a predetermined order, and switches the identifiably displayed character to a character of another row or column when a warp key is operated.

6. A character input device as set forth in claim 1, which displays the identifiably displayed character in a larger size larger than the remaining displayed characters.

7. A character input device as set forth in claim 1, which displays the characters smaller in the row or column direction around the identifiably displayed character.

8. A character input device as set forth in claim 1, which displays a center character in an identifiable manner, displays characters of the previous or next group in the row direction or column direction, and displays characters belonging to the same group as the focused character in the column direction or row direction.

9. A character input device as set forth in claim 1, which displays characters displayed in said character input region three-dimensionally by one of a block shape and cylindrical shape.

10. A character input device as set forth in claim 1, which provides the screen of the display unit with a text region on which selected or input characters are displayed and displays said character input region at the cursor position of said text region.

11. A character input device as set forth in claim 1, wherein said second group of two input keys are comprised of numeral keys of 0 to 9 and said display control unit replaces the currently identifiably displayed character with a character belonging to the same group as said character and separated by exactly a number of positions corresponding to a selected numeral key when a numeral key is operated.

12. A character input device as set forth in claim 1, which moves the identifiably displayed position or displayed character set at a predetermined time interval when a first group of two input key is operated and switches between displayed characters at a predetermined time interval when a second group of two input key is operated.

13. A computer-readable storage storing a program for performing a method with character input which selects a character from a set of characters displayed on a display and inputs the selected character, said method comprising:

dividing a set of characters into a first group of two input keys and a second group of two input keys and simultaneously displaying when characters of hiragana 50-character Japanese language phonetic syllabary or alphanumeric characters are divided into a plurality of groups, characters of at least two groups as at least two lines on a character input region provided on a display screen;

displaying, on an identifiably displayed position, a selected character among the characters displayed on the character input region;

switching a focus between identifiably displayed characters or character sets of the characters of at least two columns spanning from at least two lines by scrolling across the simultaneously displayed characters of at least two columns spanning from at least two lines while all the displayed characters remain the same in accordance with operation of said first group of two input keys; and switching between identifiably displayed characters or character sets in accordance with operation of said first group of two input keys; and replacing an identifiably displayed character with another character belonging to the same group as that character in accordance with operation of said second group of two input keys.

14. A method of character input which selects a character from a set of characters displayed on a display and inputs the selected character, said method comprising:

dividing a set of characters into a first group of two input keys and a second group of two input keys and simultaneously displaying when characters of hiragana 50-character Japanese language phonetic syllabary or alphanumeric characters are divided into a plurality of groups, characters of at least two groups as at least two lines on a character input region provided on a display screen;

displaying, on an identifiably displayed position, a selected character among the characters displayed on the character input region;

switching a focus between identifiably displayed characters or character sets of the characters of at least two columns spanning from at least two lines by scrolling across the simultaneously displayed characters of at least two columns spanning from at least two lines while all the displayed characters remain the same in accordance with operation of said first group of two input keys; and replacing an identifiably displayed character with another character belonging to the same group as that character in accordance with operation of said second group of two input keys.

* * * * *